United States Patent [19]
Walley

[11] Patent Number: 5,778,022
[45] Date of Patent: Jul. 7, 1998

[54] EXTENDED TIME TRACKING AND PEAK ENERGY IN-WINDOW DEMODULATION FOR USE IN A DIRECT SEQUENCE SPREAD SPECTRUM SYSTEM

[75] Inventor: John S. Walley, Lake Forest, Calif.

[73] Assignee: Rockwell International Corporation, Newport Beach, Calif.

[21] Appl. No.: 568,053

[22] Filed: Dec. 6, 1995

[51] Int. Cl.$^6$ ................................................ H04B 1/707
[52] U.S. Cl. ............................................ 375/206; 375/202
[58] Field of Search .................... 375/202, 206–208, 375/343, 344, 355; 370/503

[56] References Cited

U.S. PATENT DOCUMENTS

| | | | |
|---|---|---|---|
| 4,481,640 | 11/1984 | Chow et al. | 375/200 |
| 4,724,435 | 2/1988 | Moses et al. | 340/870.13 |
| 4,804,938 | 2/1989 | Rouse et al. | 340/310.06 |
| 5,042,050 | 8/1991 | Owen | 375/206 |
| 5,077,753 | 12/1991 | Grau, Jr. et al. | 375/200 |
| 5,103,459 | 4/1992 | Gilhousen et al. | 370/209 |
| 5,150,377 | 9/1992 | Vannucci | 375/206 |
| 5,280,472 | 1/1994 | Gilhousen | 370/335 |
| 5,309,474 | 5/1994 | Gilhousen et al. | 370/209 |
| 5,351,270 | 9/1994 | Graham et al. | 375/200 |
| 5,375,140 | 12/1994 | Bustamante et al. | 375/206 |
| 5,414,729 | 5/1995 | Fenton | 375/209 |
| 5,416,797 | 5/1995 | Gilhousen et al. | 370/209 |
| 5,511,090 | 4/1996 | Denton et al. | 375/206 X |
| 5,559,840 | 9/1996 | Melas et al. | 375/355 |
| 5,574,754 | 11/1996 | Kurihara et al. | 375/367 |
| 5,598,441 | 1/1997 | Kroeger et al. | 375/344 |
| 5,644,591 | 7/1997 | Sutton | 375/200 |

*Primary Examiner*—Young T. Tse
*Attorney, Agent, or Firm*—James P. O'Shaughnessy; William C. Cray

[57] ABSTRACT

A direct sequence spread spectrum communication system in a digital cordless telephone having a basestation and a handset that each implement an extended ¦EE¦+¦E¦–¦L¦–¦LL¦ time tracking system and peak matched filter demodulation within a related window to permit one sample per chip analog-to-digital conversion and demodulation for longer code sequences (providing savings in hardware and complexity) and to permit enhanced two sample per chip analog-to-digital conversion and demodulation for shorter code sequences (providing more robust fading immunity).

18 Claims, 14 Drawing Sheets

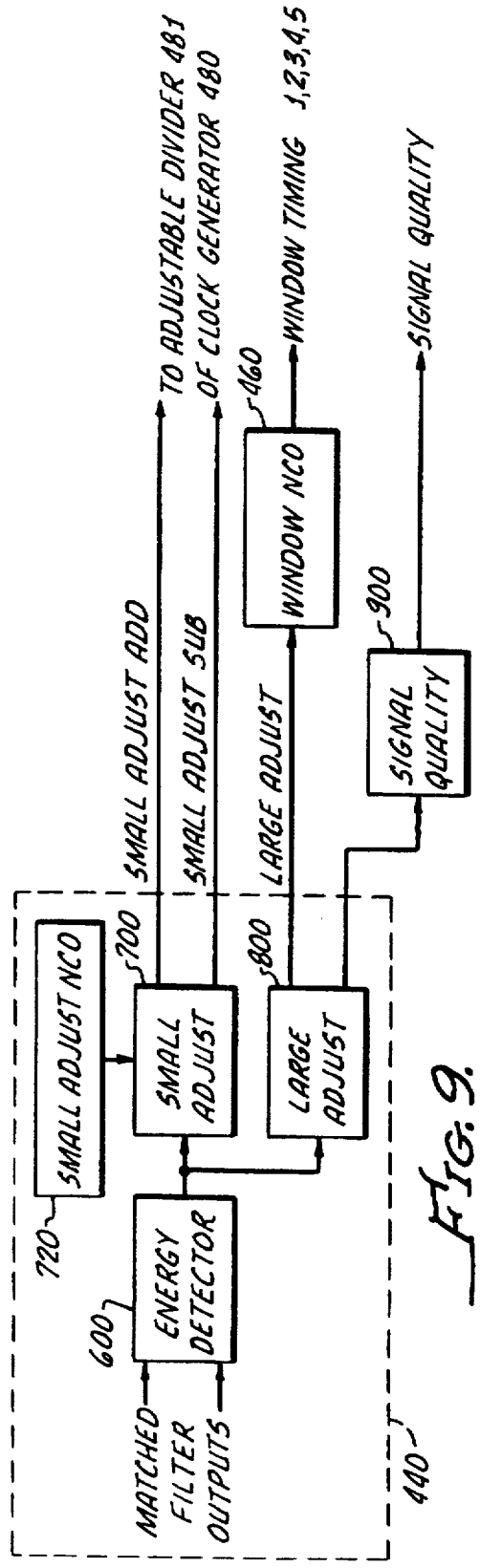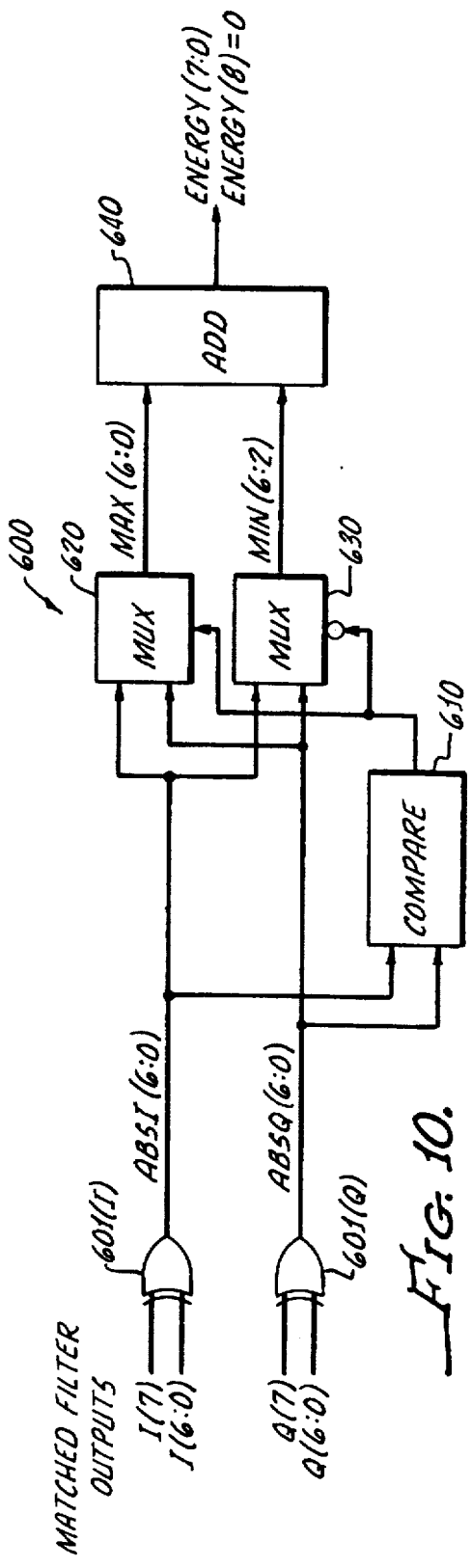

EXTENDED TIME TRACKING AND PEAK ENERGY IN-WINDOW DEMODULATION FOR USE IN A DIRECT SEQUENCE SPREAD SPECTRUM SYSTEM

BACKGROUND OF THE INVENTION

1. Field of the Invention

The present invention relates generally to digital cordless telephones and, more particularly, to a new and improved time tracking system for a direct sequence spread spectrum (DSSS) communication system in a digital cordless telephone that uses extended time tracking and peak energy demodulation for enhanced immunity to multipath fading and to permit time tracking with as little as one sample per chip A/D conversion and matched filtering.

2. Description of Related Art

There are numerous cordless phones that use analog frequency modulation in the 46/49 MHz band. Such analog cordless phones have become very popular. Nonetheless, they suffer from range limitations, few channels, and minimal security. As a result, there is a need to provide a cordless phone product that provides a longer range without dropouts, more channels, and greater security.

Use of digital modulation and digital coding techniques offers more robust voice communication over a radio channel, although requiring greater channel bandwidth. Digital modulation also has a capture effect that greatly surpasses co-channel and adjacent channel interference, thereby providing a more noise-free conversation. Use of digital modulation encoding also allows for the addition of effective scrambling codes to greatly improve telephone security. In addition, by using the industrial, medical, and scientific (ISM) band for radio transmission and reception (902–928 MHz), increased power levels above those in the 46/49 MHz band are permitted, thus increasing the operating range. The primary FCC requirement for operating in the ISM band at the highest transmit power levels is using direct sequence spread spectrum (DSSS) or frequency hopping spread spectrum (FHSS) modulation.

DSSS modulation provides bandwidth spreading that is large compared to the bandwidth required by the information signal. A DSSS system uses a series of "chips" from a very fast code sequence for spreading an RF carrier, often by modulating the carrier using binary phase shift keying (BPSK). The receiver, of course, must duplicate the code sequence to "despread" the received signal. In order to remove the code sequence, a DSSS system generally samples the received analog signal with an A/D converter and then passes the digital signals through a matched filter at the sampling rate. The conventional DSSS system uses ordinary, 3-sample wide |E|–|I| time tracking and standard demodulation wherein the correlation "on time" peak is used for demodulation and the sample before and after the peak is used to perform a time discrimination function |E|–|L| to allow a timing NCO lock and to remove small "on time" peak timing errors. Such systems are usually called E, OT, L systems.

A hypothetical DSSS system of lowest cost and power consumption would use single sample per chip A/D conversion and matched filtering. The present inventor is unaware of any DSSS systems, however, that does this because of time tracking and demodulation problems when sampling below the Nyquist rate.

The known DSSS systems that use 3-sample wide |E|–|L| time tracking and standard demodulation typically run multiple samples per chip through the A/D conversion and matched filtering stages to effectively discriminate the correct timing. Such a brute force approach increases design complexity and fabrication cost by requiring more hardware to accommodate the multiple samples and lowers performance by requiring more compute time. The foregoing problem is particularly evident in systems that must process long code sequences for high processing gain.

The conventional DSSS modulation system is, moreover, subject to multipath fading even with multisample per chip processing because the one peak the |E|–|L| tracking system locks on may not be the best signal.

SUMMARY OF THE INVENTION

A DSSS system according to the present invention overcomes the multipath fading problem associated with conventional DSSS systems by using an extended five-sample wide |EE|+|E|–|L|–|LL| time tracking system and by demodulating the sample with the peak estimated signal energy within the window that contains the EE through LL samples.

A DSSS system according to the present invention preferably implements the extended |EE|+|E|–|L|–|LL| time tracking and peak estimated energy demodulation using one sample per chip A/D conversion and matched filtering if the subject system uses a relatively long code sequence, for the most cost/power saving, and multiple samples per chip A/D conversion and matched filtering if the subject system uses a relatively short code sequence such as a 12-chip code that complies with FCC spread spectrum requirements for a digital cordless telephone, because the cost/power savings are less.

BRIEF DESCRIPTION OF THE DRAWINGS

The features, objects, and advantages of the present invention will become more apparent from the detailed description set forth below when taken in conjunction with the following drawings wherein:

FIG. 9 is a block diagram of the functions used to acquire and then maintain a Demodulation Window;

FIG. 10 is a block diagram of the Energy Detector 600 of FIG. 9;

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out the invention. Various modifications, however, will remain readily apparent to those skilled in the art, since the generic principles of the present invention for providing extended |EE|+|E|−|L|−|LL| time tracking and peak estimated energy demodulation have been defined herein.

STRUCTURAL OVERVIEW

Figure 1:
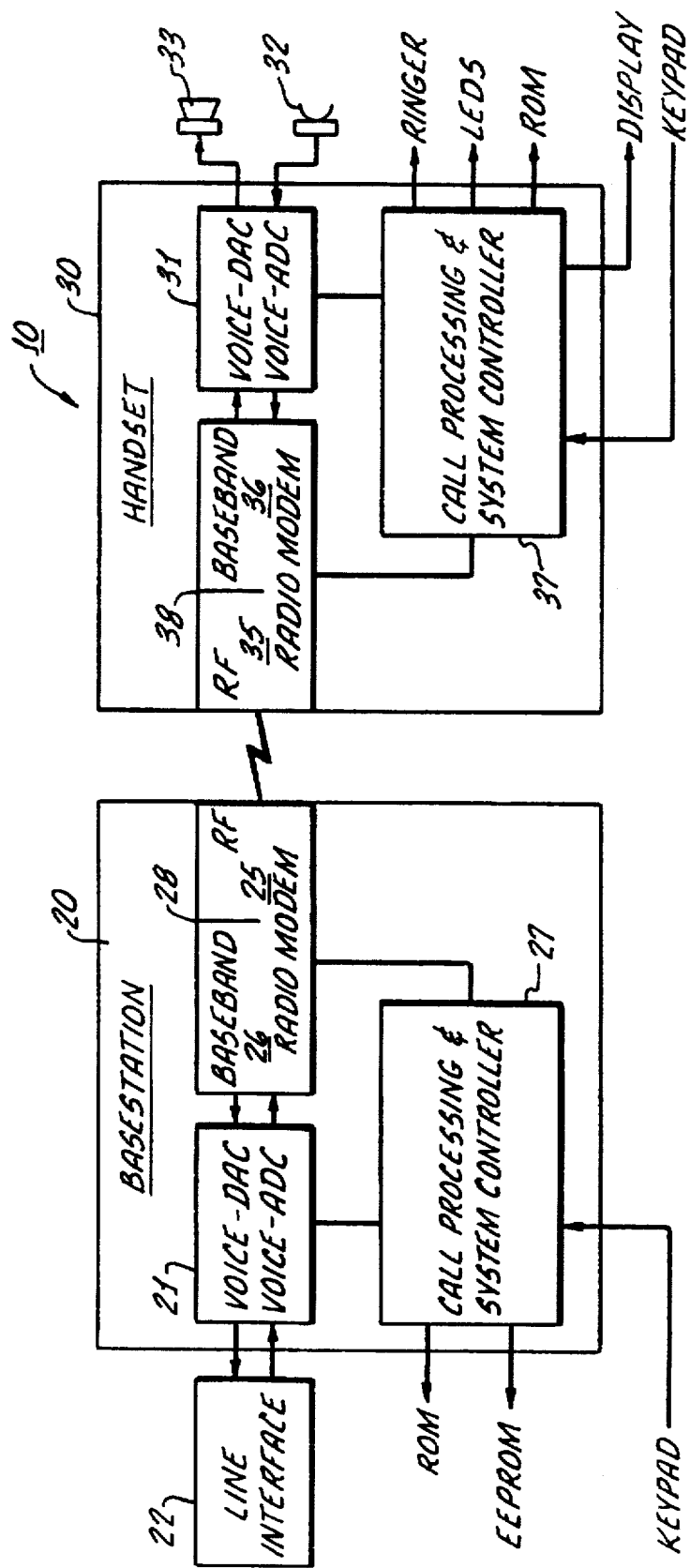
FIG. 1 is a system-level diagram of a basestation and handset that collectively form a DCT system according to the present invention.

As shown in FIG. 1, a digital cordless telephone (DCT) 10 according to the present invention comprises a basestation 20 and at least one handset 30. The DCT 10 is designed to provide full duplex voice communication between the handset 30 and the public switched telephone network (PSTN) (not shown) by way of an RF link through the basestation 20.

The basestation 20 and the handset 30 both include a Radio Modem 28, 38, respectively, which are composed of an RF Modem 25, 35 and a Baseband Modem 26, 36, respectively. The RF Modems 25, 35 transmit digital voice and control data between the basestation 20 and the handset 30. The basestation 20 and handset 30 also have Audio Modems 21, 31 that respectively provide voice transport between the basestation 20 and the PSTN and between the handset 30 and a microphone 32 and a speaker 33. Finally, the basestation 20 and the handset 30 both have a system controller 27, 37, respectively, for call processing and control functions. The controllers 27, 37 function to provide the protocol for the Radio Modems 28, 38 to allow link establishment, maintenance, and power management.

The preferred RF Modem 35 is a direct conversion transceiver. For transmit, analog wave-shaped baseband data (TXD) is modulated directly to the carrier frequency. For receive, the carrier is directly converted to analog baseband in-phase (RXI) and quadrature (RXQ) signals. The preferred DCT 10 uses frequency division multiple access (FDMA) channelization which, in the 26 MHz-wide ISM band, provides 21 frequency channels at 1.2 MHz channel spacing.

The preferred Baseband Modem 36 is a narrow-band direct sequence spread spectrum (DSSS) burst modem that supports FDMA channelization and time division duplexing (TDD). The preferred transmit and receive time slots are both 2 ms wide, providing a 4 ms Tx/Rx superframe. The preferred modulation for data is differentially encoded Binary Phase Shift Keying (BPSK), and for the spreading code is BPSK. The differential encoding of the data is done such that a change of polarity over a bit interval represents a "−1" and a continuity of polarity represents a "+1."

The DCT 10 preferably uses bipolar signalling where +1 volt signal represents a binary "1" and a −1 volt signal represents a binary "0". Each bit is preferably direct sequence spread spectrum modulated with a 12-chip spreading code. The preferred spreading code repeats on bit boundaries so that it remains "as is" when multiplied by a binary "1" (+1 volt) and is inverted when multiplied by a binary "0" (−1 volt). The preferred bit rate is 80 kHz, whereby the chip rate for the preferred 12-chip spreading code is 960 kHz (12×80 kHz).

Figure 5:
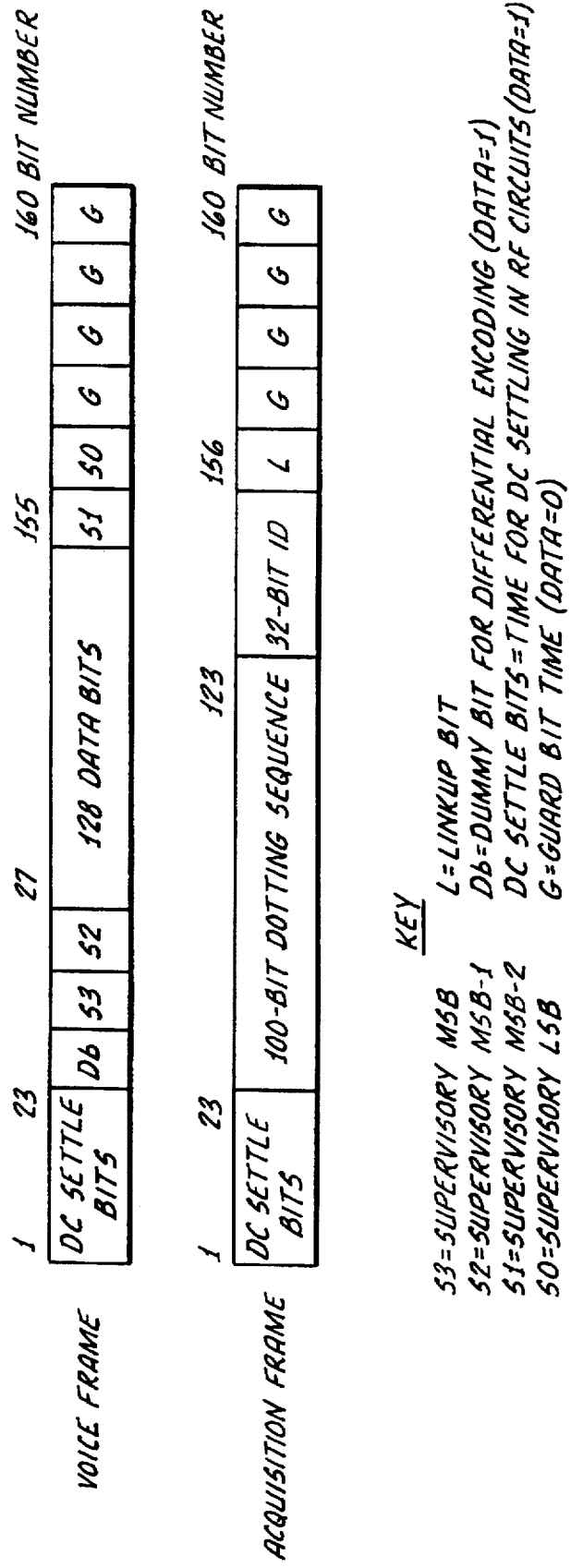
FIG. 5 shows the structures for two types of Tx frames that are use in the preferred digital cordless telephone embodiment, an acquisition frame (A-Frame) and a voice frame (V-Frame)

FIG. 5 shows the preferred 160-bit frame structures for a voice frame (V-frame) and an acquisition frame (A-frame). In the V-frame, the "Db" bit (24) is always "+1" to provide an initial phase reference for decoding the differentially encoded data during reception. In the A-frame, the first 23 bits (1–23) are all DC settle bits (all "1"s), which allow for DC settling of bias circuits in the RF Modem 35. The next 100 bits (24–123) are dotting bits (1,0,1,0, . . . repeated), used by the Baseband Modem 36 for timing acquisition and tracking during an initial reception. The next 32 bits (124–155) are an ID word, followed by an "L-bit" (156) which is used to request an RF link response. Finally, there are 4 guard bits (157–160), which account for radio propagation and circuit delays.

Figure 2:
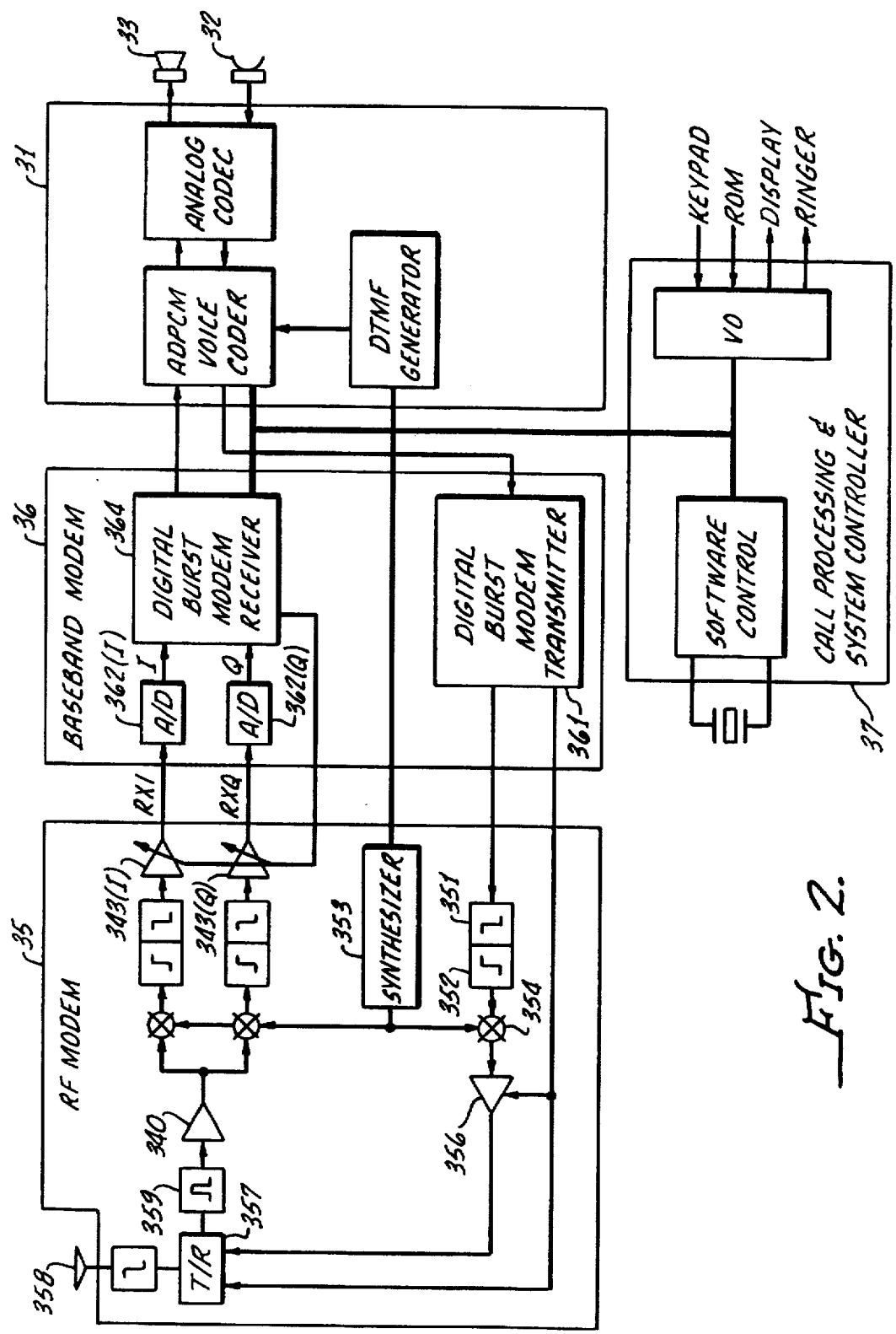
FIG. 2 is a functional block diagram of the RF Modem, Baseband Modem, Audio Modem, and Controller that are found in the handset, the functional blocks in the basestation being identical.

Referring to FIG. 2 in more detail, the preferred RF Modem 35 is shown to have a lower transmit path and an upper receive path. A common frequency synthesizer 353 provides the local oscillator frequency needed for modulation and demodulation. For transmission, the RF Modem 35 receives digital spread spectrum data TXD from the Baseband Modem 36, and passes the data TXD through a pair of filters 351, 352 to a modulator 354 where it directly modulates the RF carrier. The first filter 351 is preferably a 10 kHz high pass filter 351 for removing any DC contributed by bias networks and the second filter 352 is preferably a 650 kHz low-pass filter for spectral shaping. The modulated signal is then amplified using a variable output amplifier 356 and routed to a Transmit/Receive (T/R) switch 357 for transmission by an antenna 358. For reception, the T/R switch 357 selects the receive path from the antenna 358, filters the received signal through a band-pass filter 359 to reject out-of-band signals, and then amplifies the filtered signal with a low noise amplifier 340. The signal then enters a pair of mixers 341(I), 341(Q) that down-convert it to analog in-phase (RXI) and quadrature (RXQ) spread spectrum signals. The analog spread spectrum signals RXI, RXQ are then passed through a pair of high-pass/low-pass filter blocks 342(I), 342(Q), respectively, to provide FDMA channel selectivity. Finally, each spread spectrum signal RXI, RXQ is amplified with programmable gain amplifiers 343 (I), 343(Q) to bring the signal up to proper voltage levels.

With continued reference to FIG. 2, The Baseband Modem 36 is shown to have a transmitter block 361 and a pair of ADC's 362(I), 362(Q) that feed a receiver block 364. During transmission, the transmitter block 361 takes analog baseband data from the Audio Modem 31, digitizes it, differentially encodes it, combines it with a spreading code, and then provides the resulting digital spread spectrum data TXD to the RF Modem 35 where it directly modulates the carrier for transmission. During reception, the ADCs 362(I), 362(Q) convert the RF Modem's analog spread spectrum signals RXI, RXQ into digital spread spectrum data I, Q. The receiver block 364 receives the digital spread spectrum data I, Q. It then removes the spreading code to recover the digital baseband data, decodes the differentially encoded data, and provides the resulting digital baseband data to the Audio Modem 31 for acoustic reproduction on the speaker 33.

Figure 3:
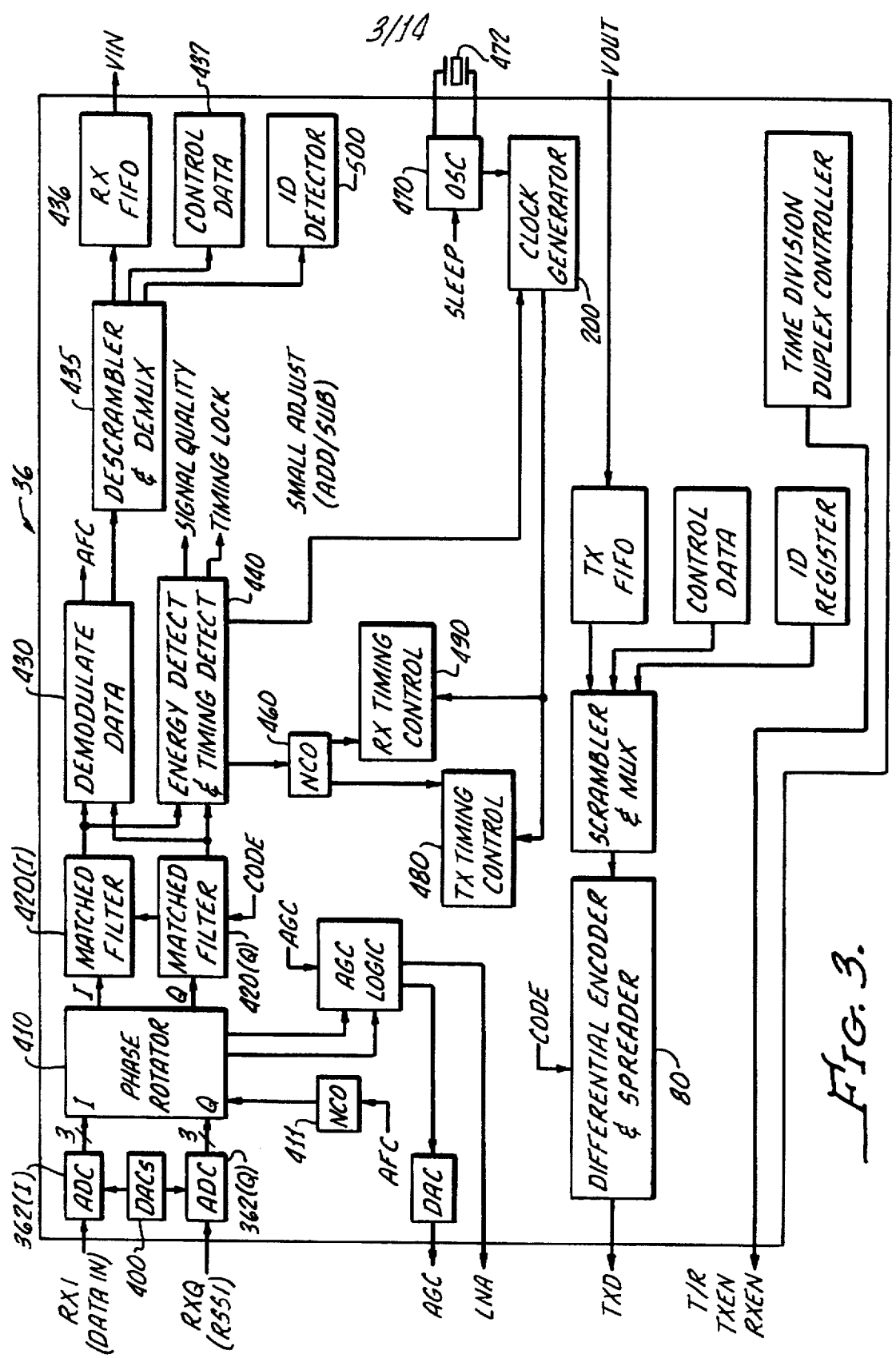
FIG. 3 is a functional block diagram of the Baseband Modem that is more detailed than that of FIG. 2.
Figure 6:
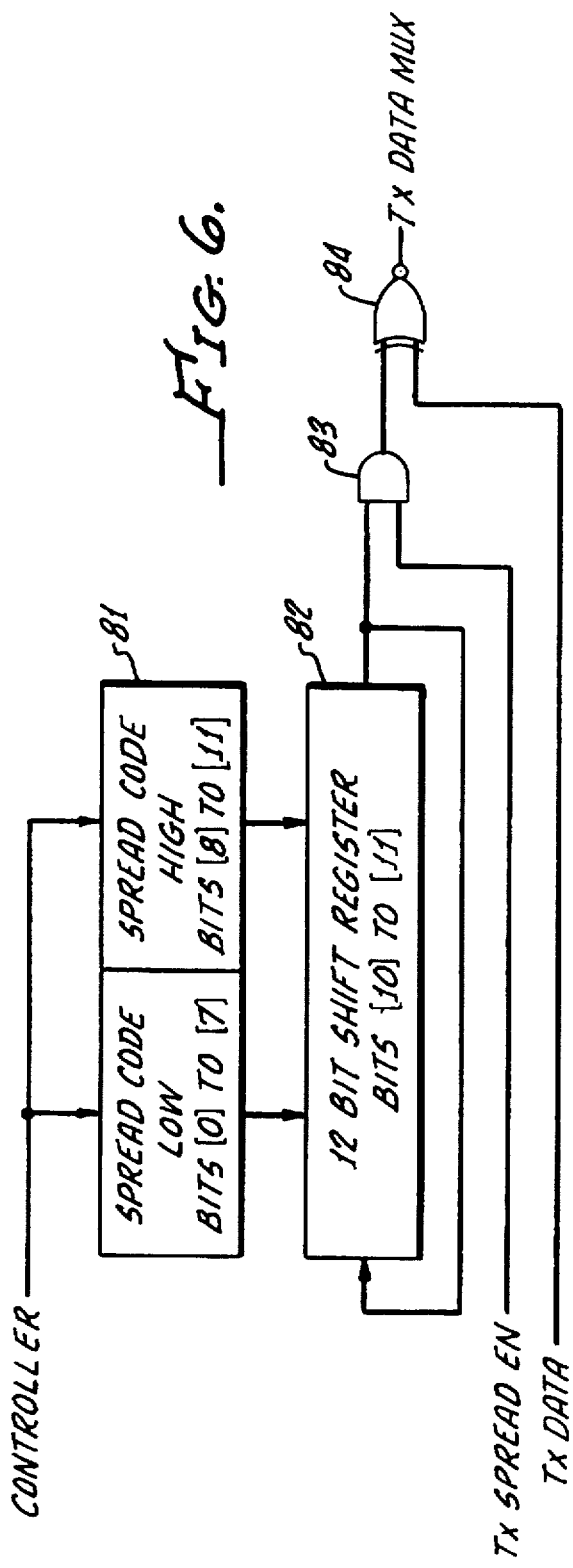
FIG. 6 is a block diagram of the preferred spreader used in the baseband modem 36 of FIG. 3.

FIG. 3 shows the major functional blocks of the Baseband Modem 36 in more detail than FIG. 2. For transmission, the digitized voice data Vout from the Audio Modem 31 is passed through a shift register Tx FIFO, scrambled for enhanced security, and then into an Encoder/Spreader block 80, where it is differentially encoded and inversion modulated with a code sequence. FIG. 6 shows a preferred spreader wherein a preferred 12-chip code is loaded from controller registers 81 into a 12-bit shift register 82. As the 12-chip code is shifted around the register, it is combined through AND gate 83 (for spreading enabling/disabling) to X-OR gate 84 where it modulates differentially encoded data TxData.

During reception, the in-phase and quadrature analog signals RXI, RXQ are provided to the ADC's 362(I), 362(Q) for conversion to corresponding digital signals I, Q. The preferred ADC's 362(I), 362(Q) sample the analog baseband signals RXI, RXQ at 1.92 MHz (2 times the chip rate) and convert such analog signals into a series of 4-bit, 2's complement, digital signals I, Q. The high and low threshold voltages of each ADC are automatically adjusted with appropriate software using DAC's 400. The ADC's preferably implement the following quantization values to reduce the data-movement requirements (ensuring the 1sb is always "1" so it may be implied) and to simplify later multiplication of the digital spread spectrum signals I, Q by ±1 (requiring only a simple inversion of the most significant three bits):

1001 (−7)
1011 (−5)
1101 (−3)
1111 (−1)
0001 (+1)
0011 (+3)
0101 (+5)
0111 (+7)

The digital signals I, Q then pass through a phase rotator 410 that is controlled by an AFC signal and NCO 411. The phase rotator 410 adjusts the phase of the I, Q vector to improve demodulation performance by reducing frequency errors present in the signal. The details of the phase rotator 410 are not necessary for an understanding of the herein claimed invention.

Next, a pair of matched filters 420(I), 420(Q) despread the digital spread spectrum signals I, Q by comparing such signals to the same spreading code that was used in the transmitter.

The Preferred Code Sequence

The chosen code is important to system operation. The code sequence is typically selected to maximize certain desired characteristics including, for example, good autocorrelation, noise immunity, Tx spectrum, and low intersymbol interference. DSSS systems often use very long code sequences (e.g. 1023 chips or more) to provide higher noise immunity by spreading the data over a wider bandwidth. In the digital cordless telephone, however, a shorter code sequence is preferred because it can be implemented at less design and fabrication cost but still offer excellent communication quality for a cordless telephone.

The FCC requires that the code sequence be ≧10 chips in length and that the system exhibit ≧10 dB in processing gain. Consequently, the present invention preferably implements a short code sequence that is close to the FCC minimum to provide an efficient, cost-effective implementation, while still providing high quality, reliable operation. Various code sequences are available as candidates. The best cope ≧10 chips long, however, is an 11-chip Barker sequence {11000100010} because it has perfect spectrum flatness and minimum off correlation values.

Figure 7:
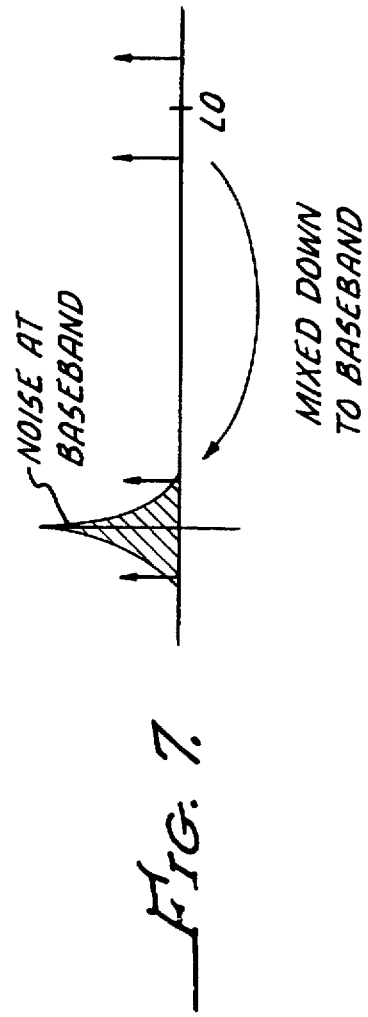
FIG. 7 is an exemplary graph of power versus frequency illustrating the noise that is ordinarily introduced into baseband by direct conversion radio.

The cordless telephone of the present invention uses a direct conversion architecture, meaning that the RF carrier-plus-data signal is down converted directly to baseband rather than first being converted to an intermediate frequency. Since our baseband here is phone-quality voice data, the necessary bandwidth is only about 30 Hz to 3,000 Hz. As shown in FIG. 7, however, a direct conversion architecture typically produces a great amount of low frequency noise that may deteriorate the fidelity of our voice data. The present invention counters such noise problem by ensuring that the voice data is modulated with a code sequence that has no energy at low frequencies or at DC. The invention accomplished this with an innovative modification to a standard Barker code, i.e. by adding a one more chip, a −1 or a +1, to convert the 11-chip Barker code into an even length 12-chip code that has an equal number of +1's and −1's. This 12-chip code might be called an Augmented Barker Code. The 12-chip Augmented Barker Code beneficially has no energy at low frequencies, or at DC, so that no noise is mixed down into our baseband. The noise is removed by a high pass filter, whereas the signal is left untouched in the direct conversion receiver.

An example of such a code is 111100010010. Note that there are other "good" 12-chip codes that available with varying degrees of performance in correlation values, and spectral output, such as {111000110010}. Such alternative codes have slightly different spectral shapes which allow detailed system optimization. The fundamental advantages is lower energy at low frequencies while meeting the FCC requirement of ≧10 chips/bit with minimal chips/bit.

Matched Filters

Figure 8:
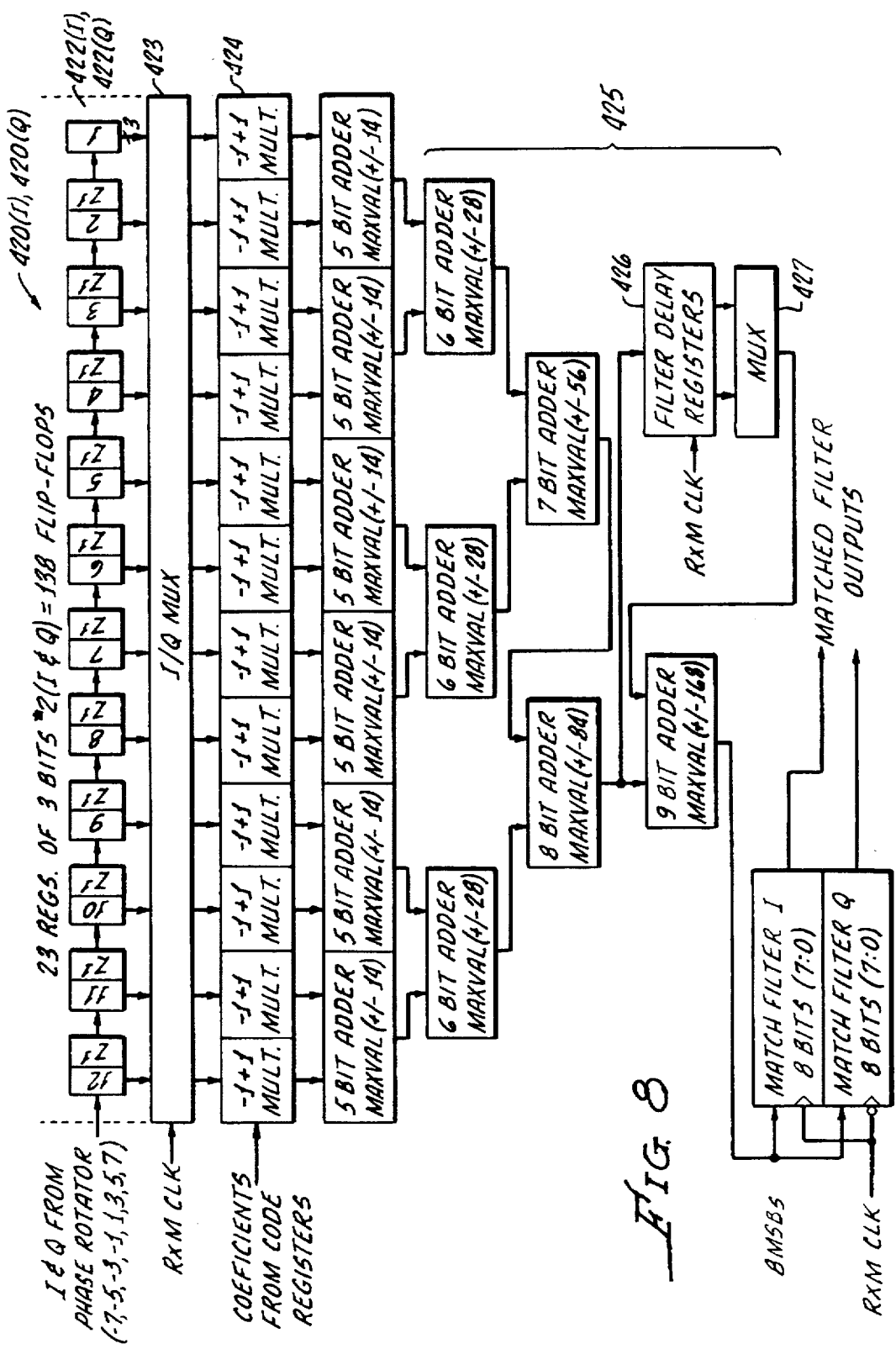
FIG. 8 is a block diagram a preferred implementation of the matched filters 420(I), 420(Q) shown in FIG. 3.

FIG. 8 shows a preferred construction for the matched filters 420(I), 420(Q). The construction shown is clocked at multiple samples per chip, namely two, given the relatively short 12-chip code sequence used in this embodiment. In operation, the digital data I, Q from the ADC's 362(I), 362(Q) are simultaneously clocked into two, separate 23-long series of 3-bit registers 422(I), 422(Q) at the ADC sampling rate of 1.92 MHz. As already mentioned, 1.92 MHz is 2 times the chip rate of 980 kHz. A total of 24 samples are obtained, therefore, for each bit that was modulated by our 12-chip spreading code—two samples for each chip interval.

The two matched filters 420(I), 420(Q) are preferably implemented, as shown, by time-sharing a coefficient multiplier 424 and a summing network 425. An I/Q MUX 423 is used to alternately provide the I data, and then the Q data, to the coefficient multiplier 424 and the summing network 425. Since the Matched Filters 420(I), 420(Q) are oversampled to 24 samples per bit, the filter's coefficients are also oversampled to 24 (12 chips * 2 samples/chip) with zero insertion between taps.

The filter coefficients are +1 for One Code Bits, and −1 for Zero Code Bits. For example, a 12-chip spreading code of:

111100010010 would result in the following coefficients used for multiplication:

+1, +1, +1, +1, −1, −1, −1, +1, −1, −1, +1, −1

The multiply operation is beneficially simplified by having already limited the digital signals I, Q to 4-bit, 2's complement values of (−7, −5, −3, −1, 1, 3, 5, 7). Multiplying by −1 simply requires an inversion of the 3 msbs and multiplication by +1 requires no change at all.

The preferred circuit of FIG. 8 further minimizes hardware by summing 24 values in 12-value increments. This 12+12 summing is effected by summing the first 12 values for I & Q, storing these values in filter delay registers 426, and then adding such values to the next 12 values through a summing MUX 427. Note that only 12 of the 23 values held in the shift registers 422(I), 422(Q), or every other one, are passed through the I/Q MUX 423 at any one time, 11 of the other 12 values being temporarily held between the first values that are passed and the 12th value coming in from the phase rotator 410.

The maximum output of the matched filters is ±168, values that would occur only if the digital spread spectrum data I, Q from the ADC's was arriving at ±7 and all 24 samples were in perfect code correlation (24 * 7=168). The peak correlation values from the matched filters will typically be significantly less than the maximum, around ±120, because the ADC's will calibrate under ±7.

The outputs of the Matched Filters 420(I), 420(Q) are provided to a Data Demodulator Block 430 and to an Energy/Timing Detect Block 440.

Matched Filter Outputs—Demodulation

Figure 4:
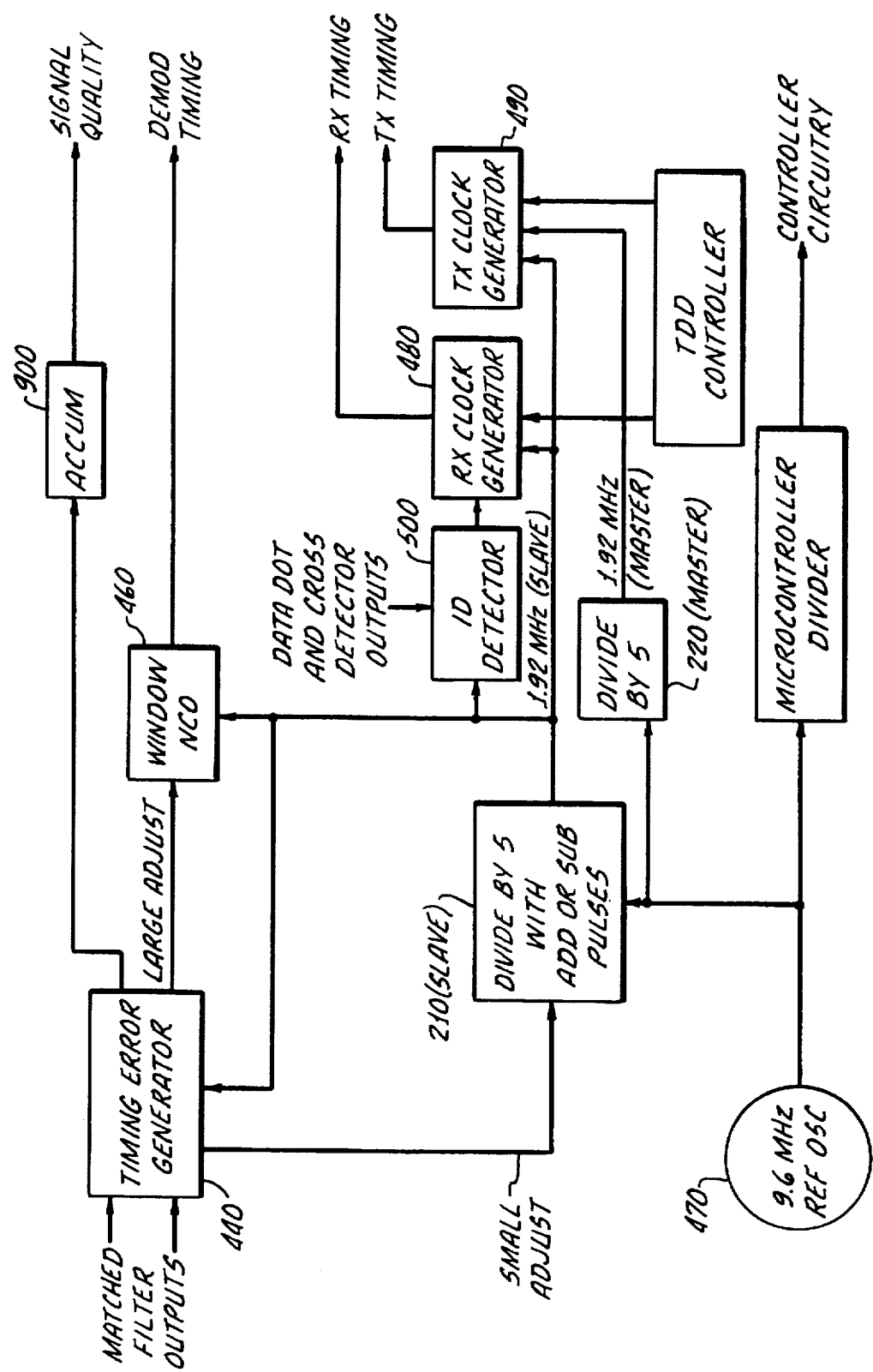
FIG. 4 is a functional block diagram that illustrates the generation of timing clocks in the Baseband Modem of FIG. 3.

The Data Demodulator Block 430 demodulates the differentially encoded data contained in the complex I/Q vector at times associated with so-called Window Timing Control signals that are generated by a Window NCO 460 (not shown in FIG. 3, but see FIG. 4). In particular, the I & Q Matched Filter Data are processed at the appropriate times using dot product and cross product demodulation on I & Q data that is exactly 1 bit clock apart, where:

$Dot\ Product = Icurrent*Idelayed + Qcurrent*Qdelayed$ $Cross\ Product = Icurrent*Qdelayed - Qcurrent*Idelayed$ The Data Demodulator Bock 430 then outputs the data through a Descrambler/Demultiplexer 435 to an Rx Buffer 436 (FIFO) for rate adaption, a Control Data Block 437 for storing supervisory data contained in V-frames, and an ID Detector 500.

It is sufficient here to visualize the ID Detector Block 500 as monitoring the output of the Data Demodulator Block 430 in order to detect the ID word in the A-frame of FIG. 5. The ID Detector 500 performs this detection function by simply determining if some 32-bit long sequence of bits matches the 32 bits corresponding to the predetermined ID word. In particular, the ID Detector 500 shifts in the data, repeatedly compares it with an ID Register, and generates an ID detect signal if it matches. The ID word is used to inhibit false links from nearby transmitters or noise and also, as explained further below, to establish frame timing.

Matched Filter Outputs—Energy Detection

The matched filters 420(I), 420(Q) are also connected, as shown in FIG. 3, to an Energy/Timing Detect Block 440. As shown in FIG. 9, the Energy/Timing Detect Block 440 comprises several sub-operations including an Energy Detector 600 that drives a Small Adjust Block 700 and a Large Adjust Block 800 that are used for synchronization and tracking, and also to a Signal Quality Block 900.

FIG. 10 show a preferred construction for the Energy Detector 600 of FIG. 9 in more detail. As shown, the Energy Detector 600 simply generates a 9-bit energy metric for use by the timing and signal quality circuits 700, 800, 900. The metric is derived from the I and Q outputs from the Matched Filters 420(I), 420(Q) and is an estimate of the signal's envelope. The ideal energy detector would calculate the power of the I/Q vector using the formula $$Power = (I^2 + Q^2)^{1/2}$$

This formula, however, requires high compute at the Rx sample rate which, in the preferred embodiment, is 1.92 MHz. An alternative formula that requires less compute is:

$Energy\ Estimate = Max(|I|, |Q|) + \frac{1}{4}*Min(|I|, |Q|)$

The I and Q values will be 8-bit 2's complement numbers. Accordingly, the absolute values may be approximated by using the 7lsbs if the number is positive and using the inverted 7lsbs if the number is negative. The absolute value of the negative value will be off by one 1sb since the addition of 1lsb is required to complement a 2's complement number.

The preferred Energy Detector 600 of FIG. 10 implements the above Energy Estimate using a pair of X-OR gates 601(I), 602(Q) to obtain the absolute values of I & Q, a compare block 610 that compares the absolute values and selects the larger value with a Maximum MUX 620 and the smaller value with a Minimum MUX 630, and an adder 640 that adds the larger value to ¼th of the smaller value.

The Energy Detector 600 outputs this Energy Estimate calculation as an 8-bit positive value which, as shown, requires a 9th bit (fixed value=0) for a 2's complement representation.

Synchronization and Tracking—Generally

Returning to FIG. 3, one sees that the Baseband Modem 36 includes Tx Timing and Rx Timing Control Blocks 480, 490 that are nominally driven by a system clock source consisting of a reference oscillator 470 and its associated crystal 472. The reference oscillator 470 preferably oscillates at 9.6 MHz and drives a main clock generator circuit 200 that, in turn, provides lower frequency clocking for transmission and reception via dividers in the Tx Timing and Rx Timing Control Blocks 480, 490.

For transmit purposes, the Baseband Modem 36 has two timing synchronization modes: "Master" or "Slave." Either the basestation 20 or the handset 30 can be the Master, depending on which is initiating the RF link. The noninitiating unit become the Slave. If the Baseband Modem 36 is operating as the Master, then its transmit timing is derived from its own free-running clock source. If the Baseband Modem 36 is operating as a Slave, then its transmit timing is slaved to the signal received from the transmitting Master source. The Rx timing is always derived from the received signal, however, regardless of whether the Baseband Modem 36 is operating as a Master or a Slave when transmitting.

As generally suggested by FIG. 3, the Baseband Modem 36 synchronizes Rx Timing (always Slave mode) and Tx Timing (sometimes Slave mode) by controlling the main clock generator circuit 200 with a "Small Adjust" Add or Subtract pulse.

As shown more clearly in FIG. 4, the clock generator 200 preferably generates the slower clocks pulses used for Tx and Rx Timing by dividing the 9.6 MHz output of the reference oscillator 470 through a pair of divide-by-5 dividers that nominally output 1.92 MHz main clocks: (1) a Slave Clock Divider 210 and (2) a Master Clock Divider 220. The Master Clock Divider 220 is only connected to the Tx Timing Block 490, whereas the Slave Clock Divider 210 is connected to both the Rx Timing and Tx Timing Blocks 480, 490. The Slave Clock Divider 210 is adjustable by ±1 pulse whereby it will divide by 4 or 6, instead of by 5, for one cycle. In other words, the Slave Clock Divider 210 ordinarily divides the reference oscillator's 9.6 MHz output by 5 to produce a 1.92 MHz clock. However, given a Small Adjust Add or Adjust Subtract pulse, the Slave Clock Divider 210 will temporarily require one more or one less 9.6 MHz pulse, respectively, before outputting a pulse. As a result, the output pulse train from the Slave Clock Divider 210 is either slightly advance or slightly retarded by the duration of one reference clock pulse (1/9.6 MHz=0.1042 uS).

Initial bit and frame timing are established in the basestation 20, or handset 30, by receiving the A-Frame shown in FIG. 5. In general, the receiving device's Baseband Modem hears the A-Frame, uses the dotting sequence (1,0,1,0, . . . repeated) and a "Large Adjust" timing loop in the Large Adjust Block 800 to coarsely position the "Demodulation Window" for each Rx Frame (i.e. to establish when to periodically look at the output of the matched filters), tries to decodes the ID word that would be contained in a valid A-frame, and if it succeeds in decoding the ID word, sets its frame timing to coincide with the time the ID word occurred. Once bit and frame timing has been initialized, the receiver shifts into tracking mode for further demodulation using a "Small Adjust" timing loop in the Small Adjust Block 700. If necessary, the receiver returns to the "Large Adjust" timing loop to maintain or reacquire synch.

The Demodulation Window (aka Window NCO)

A correlation peak from the Matched Filters 420(I), 420(Q) corresponds to a code alignment between the transmitter and the receiver and, as such, identifies when the I & Q signals should be sampled for code removal and demodulation. In the absence of multipath fading, the correlation peak repeats once every bit interval or, equivalently, once every 12 chip intervals, or every 24 sample intervals. The so-called "Demodulation Window" is a logical period of time that, under ideal conditions, would remain centered on each correlation peak.

Figure 13:
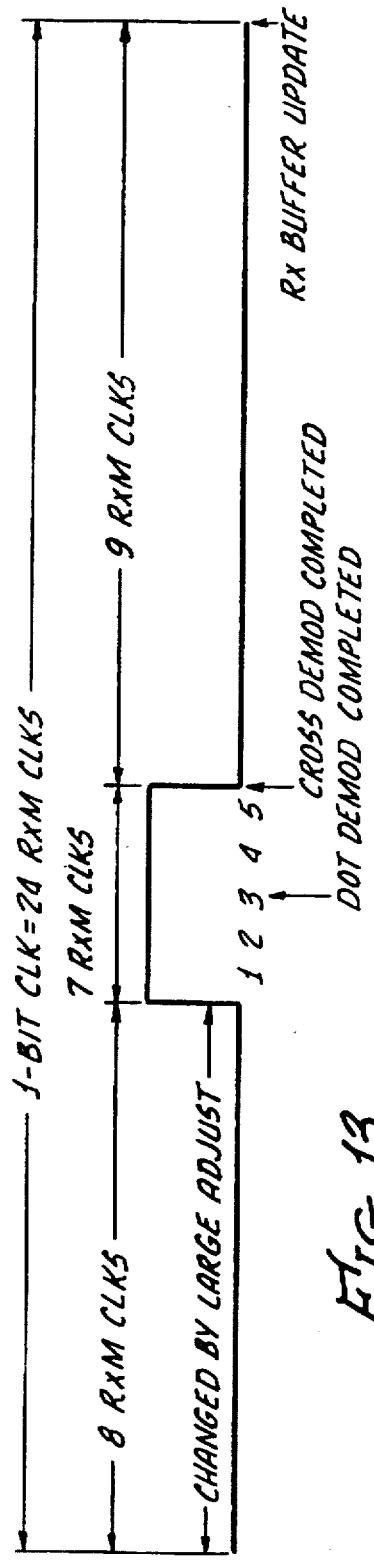
FIG. 13 is a timing diagram illustrating the initial location of the Demodulation Window relative to a bit clock.

FIG. 13 shows the initial position of the Window relative to the bit clock. If necessary, the Large Adjust Block 800 will cause the Window NCO to move the Window's position by integral ½ chip amounts, relative to the bit clock, according to a 5-bit programmable amount.

Figure 11:
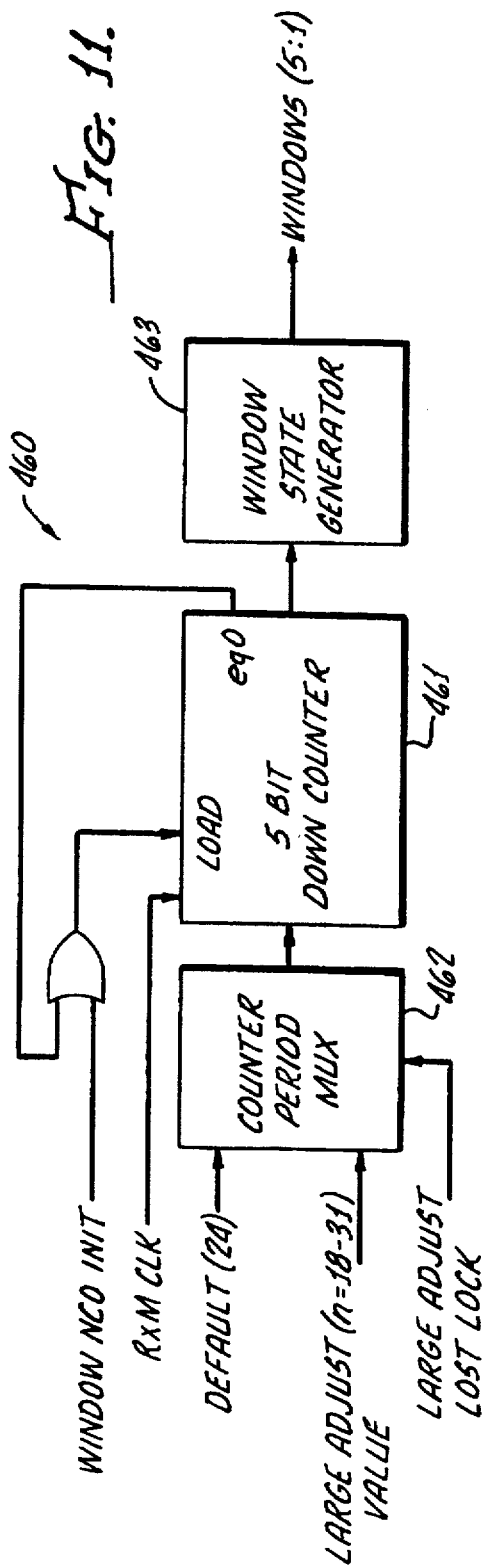
FIG. 11 is a block diagram of the Window NCO 460 of FIG. 9.

The position of the Demodulation Window relative to the bit clock is preferably maintained by a Window NCO 460 that is implemented as shown in FIG. 11. At its heart, the Window NCO 460 is an adjustable counter 461 that is clocked at the ADC sample rate of 1.92 MHz, or two times per chip interval.

Figure 14C:
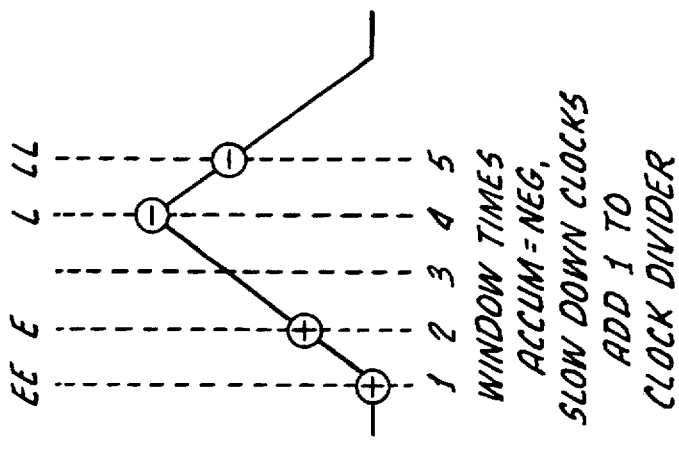
FIGS. 14(b) and 14(c) illustrate the relationship between the Demodulation Window and the idealized correlation output of the Matched Filters 420(I), 420(Q) wherein the Demodulation Window is offset in one direction or the other.
Figure 14B:
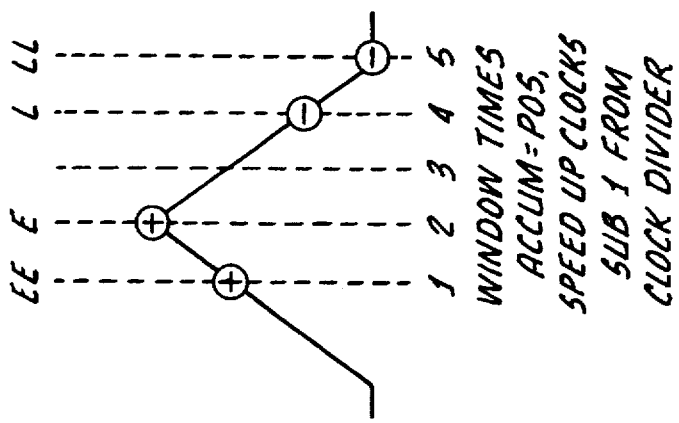
Figure 14A:
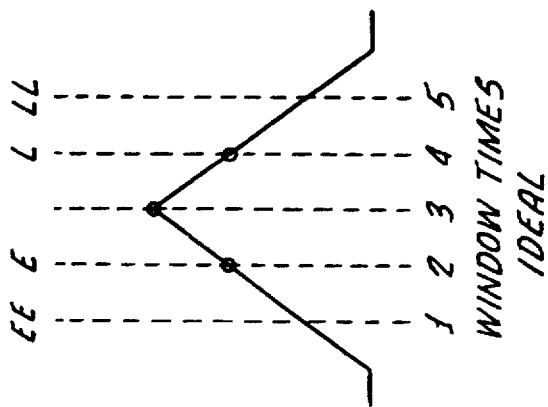
FIG. 14(a), shows the ideal relationship between the Demodulation Window and an idealized correlation output of the Matched Filters 420(I), 420(Q)

As best shown in FIG. 14(a), the Window NCO's sole purpose is to generate five discrete Window Timing control signals "Window[1,2,3,4,5]" that define a Window of time that is 5-sample clock intervals wide and centered, as best as possible, on the centroid of the correlation energy. The five control signals "Window [1,2,3,4,5]" are used by the Small Adjust Block 700 (the outer four that identify times known as EE, E, L, and LL), by the Large Adjust Block 800 (the center three), and by the Data Demodulator Block 430 (the center three).

The actual correlation curve, of course, is usually quite unlike FIG. 14(a) because of discrete time sampling, pulse shaping, and, moreover, because of multipath fading. The actual correlation output may have multiple peaks. The maximum data energy, therefore, is often not at the predicted center (i.e. Window[3]) from one bit interval to the next. The preferred DCT 10 overcomes this problem by demodulating each of the I/Q vectors associated with the three center values (i.e. Window[2,3,4]) and then selecting the one that contains the greatest estimated energy as best representing valid data.

As shown in FIG. 11, the down counter 461 in the Window NCO 460 "loads" whatever value is present at the output of a Counter Period MUX 462. It does so at initialization and every time thereafter that it reaches zero. The counter 461 is normally loaded with a default value of 24 whereby its default period is 24 sample clocks, the number of sample clocks needed to maintain the Window's nominal Large Adjust position relative to the bit clock. However, if the Window NCO 460 receives a LargeAdjust/Lost Lock signal at its Counter Period Mux 462, then a different LargeAdjust value will be loaded the next time the counter 461 reaches zero. The Demodulation Window will be repeatedly repositioned in this fashion until the peak In-Window energy once again exceeds the peak Out-of-Window energy.

The location of the Window relative to the Bit Clock (80 Khz) is preferably initialized at the beginning of each Rx frame. After the Large Adjust Block 800 has positioned the Window, the Small Adjust Block 700 will track the Tx timing by indirectly moving the Window during the frame, in small amounts, by adjusting the main Rx clock.

Demodulation as Related to the NCO Window

Figure 12:
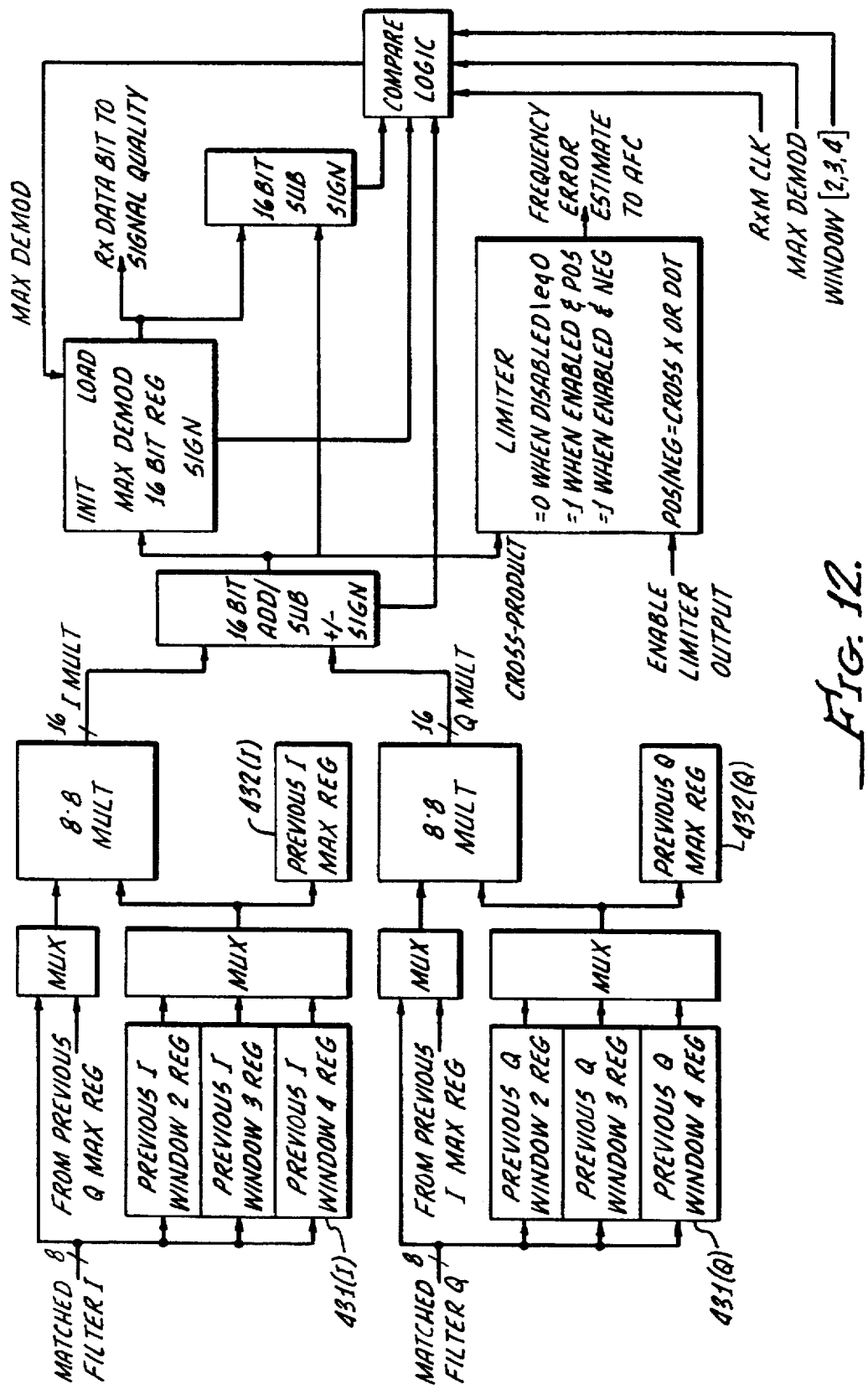
FIG. 12 is a block diagram of the Data Demodulator of FIG. 3.

Having generally explained the Window NCO 460, we now turn FIG. 12 to present the preferred construction and operation of the Data Demodulator Block shown as block 430 in FIG. 3. The Data Demodulator Circuit 430 of FIG. 12 implements the dot product and cross product demodulation discussed earlier. Significantly, the Data Demodulator Circuit 430 may be controlled to perform such demodulation on only the center sample or, more preferably, on the three center samples (using Registers 431, 432 and Window[2,3, 4,] timing signals), after which the values are compared and the one with the largest absolute value is saved in a Max Demod register 434 for output as an RxDataBit.

Initial Synchronization/Acquisition—Large Adjust Loop

As mentioned above, the initial bit timing is accomplished with the A-frame's dotting sequence (1,0,1,0, . . . repeated). As shown in FIG. 9, the Energy Detector 600 provides the Large Adjust Block 800 with an energy value, twice per chip. On an initial acquisition, the peak energy of the signal would not be inside of the Demodulation Window and the Large Adjust Block 800, detecting this, would attempt to bring the signal into the Window.

Figure 15:
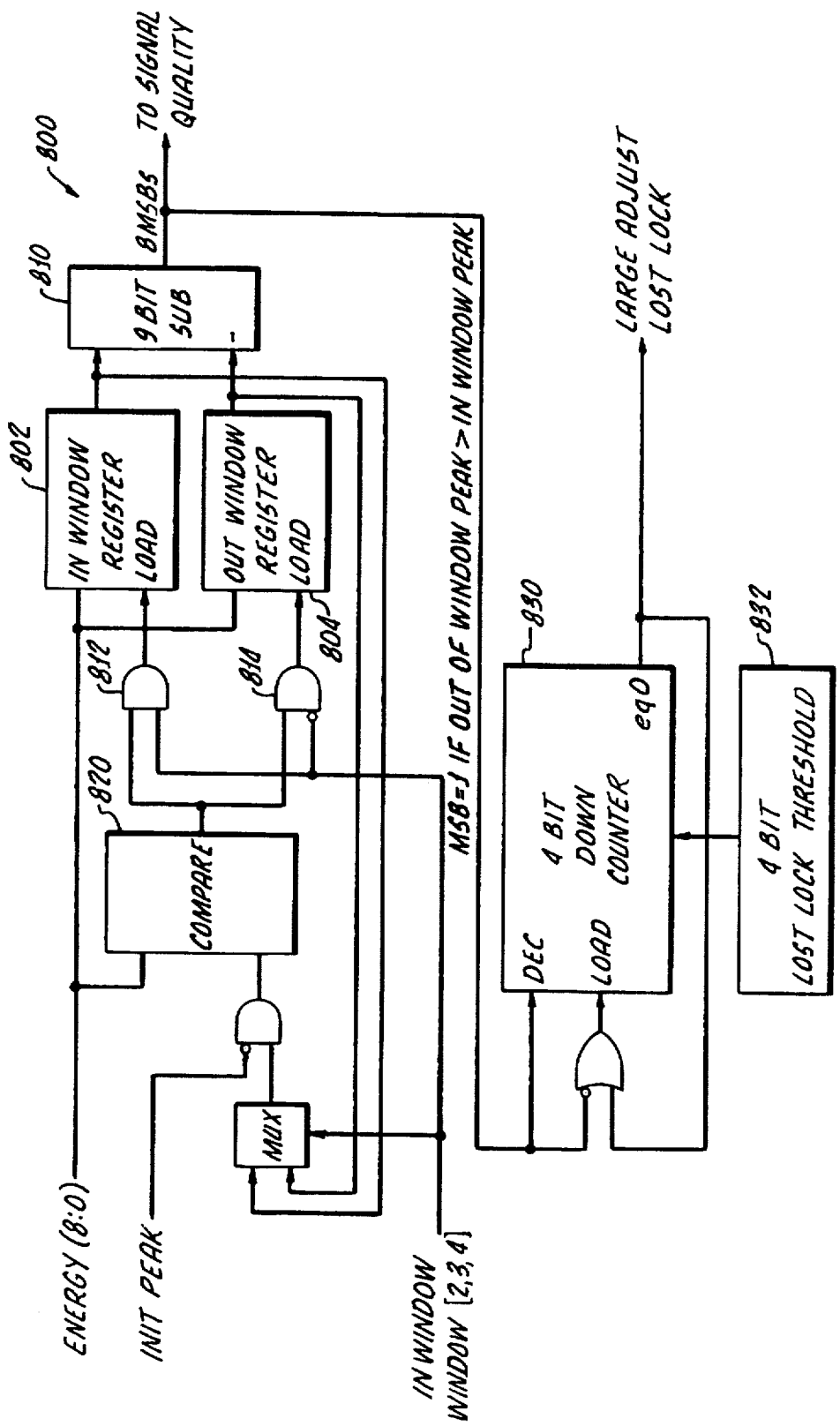
FIG. 15 is a block diagram of the Large Adjust Block 800 of FIG. 9.

FIG. 15 shows the Large Adjust Block 800 in more detail. The Large Adjust Block 800 looks at the peak estimated signal energy inside the Demodulation Window and compares it with the peak estimated signal energy outside of the Demodulation Window.

The Large Adjust Block 800 receives Window[2,3,4] timing signals from the Window NCO of FIG. 11. The energy signal received at each of the successive Window[2,3,4] times is compared to the value already stored in the In-Window Register 802 by a Comparator 820. If the incoming energy value is larger, the Comparator 820 causes the In-Window Register 802 to "load" it in place of the existing energy value, the final energy value being the peak value in the Window. A similar process is performed to load the peak energy value found in sample intervals located outside of the Window (21 in the preferred embodiment) into the Out-Window Register 804. The value in the Out-Window Register 804 is then subtracted from the value in the In-Window Register 802 to determine whether or not the peak energy was larger inside of or outside of the Window.

When the peak energy inside the Window is smaller than the peak energy outside the Window, an error bit is set that decrements a down counter 830. A single timing error bit is generated by taking only the msb of the subtractor 810, the msb being a "0" if the subtraction result was positive and a "1" if it was negative. A programmable threshold of 0 to 15 is set via a 4-bit Lost Lock Threshold register 832. When the programmable threshold is exceeded, the filter is cleared and the Large Adjust Block 800 outputs a "LargeAdjust/LostLock" signal that, as suggested by FIG. 11, is used to advance the Demodulation Window by a programmable LargeAdjust Value, such as n=18–31.

Initial Synchronization/Acquisition—Small Adjust Loop |EE|+|E|−|L|−LL| Processing As shown in FIG. 9, the Energy Detector 600 also provides an Energy value to the Small Adjust Block 700. The Small Adjust Block 700 advances or retards the Main Clock Divider 210 of FIG. 4 by ±1 system clock pulses as describe earlier.

The Small Adjust Block 700 determines whether or not the Demodulation Window has drifted from center as shown in FIGS. 14(b) or 14(c) for a predetermined number of bit intervals and, if so, generates an appropriate SmallAdjustAdd or SmallAdjustSub signal that moves the Demodulation Window toward an aligned position as shown in FIG. 14(a).

Figure 16:
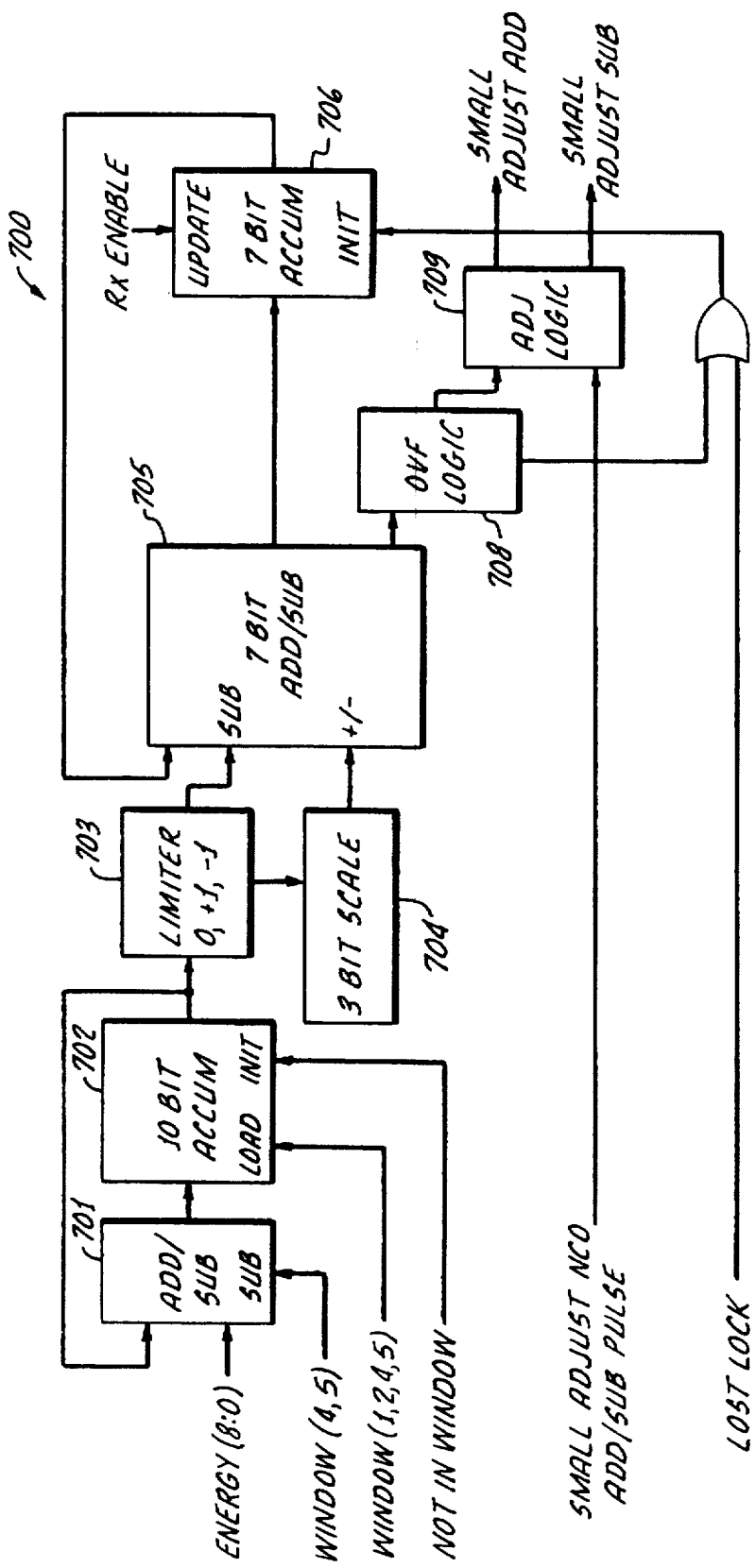
FIG. 16 is a block diagram of the Small Adjust Block 700 of FIG. 9.

FIG. 16 shows the preferred implementation of the Small Adjust Block 700. The Small Adjust Block adds the energy value for the first two clocks of the Window (Window[1,2], aka EE and E) and subtracts the energy value for the last two clocks of the Window[4,5], aka L and LL). The energy value at the center (Window[3]) is not used. The preferred Small Adjust Block 700 uses an Adder/Subtractor 701 and a 10 bit accumulator 702 to perform the just-described |EE|+|E|−L|−LL| process. The result available at the output of the accumulator 702 is then processed by a Limiter 703 to determine whether it is negative, positive, or zero. The output of the Limiter 703 is used to control a Small Adjust Accumulator 706 by using an Adder/Subtractor 705 to add or subtract a programmable 3-bit Small Adjust Scale 704 to the accumulator value. If the Limiter 703 output is negative (positive), the Small Adjust Scale 704 is subtracted (added).

When the Adder/Subtractor 705 overflows, or underflows, then one clock pulse is added, or subtracted, from the Main Clock Divider 210. The Adder/Subtractor 705 drives an Overflow Logic Block 708 which, in turn, drives an Adjustment Logic Block 709 that generates an appropriate SmallAdjustAdd signal or SmallAdjustSub signal.

Figure 17:
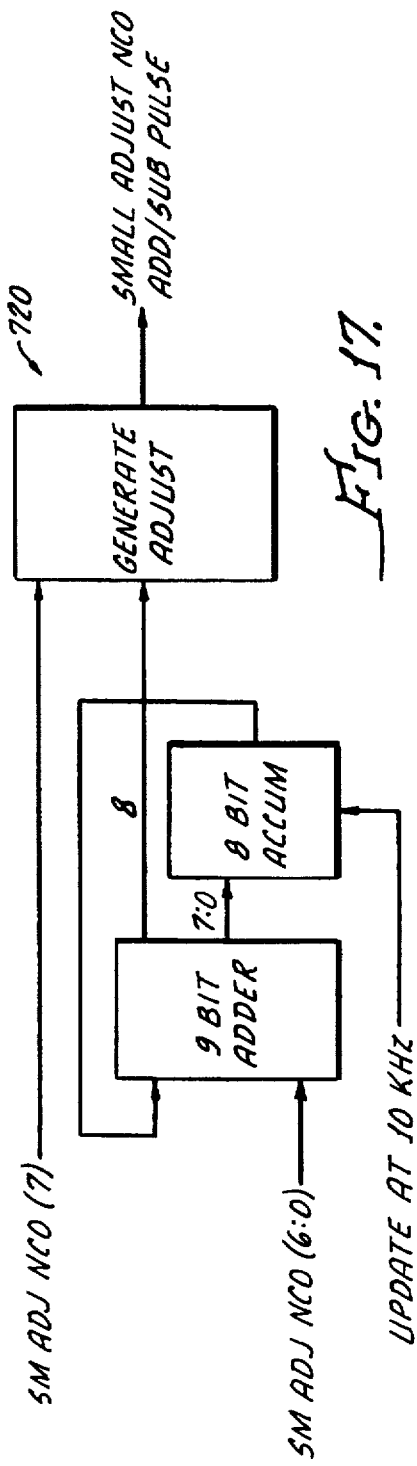
FIG. 17 is a block diagram of the Small Adjust NCO 720 of FIG. 9.

A Small Adjust NCO 720, shown in FIG. 17, also drives the Adjustment Logic Block 709 of FIG. 16. The Small Adjust NCO 720 is used to continuously small adjustments to approximate actual time drifts in the system due to clock errors. This is needed in addition to the small adjustments made during Rx Demodulation (when the timing errors are large) because, otherwise, timing errors of large magnitude would accumulate during transmission.

Signal Quality

An important feature for a system is to quickly and accurately detect when the signal is bad for muting audio signals. The standard calculation methods use estimated Signal-to-Noise Ratio (SNR) or bit error rate (BER) estimates with CRC coding. These methods, however, are overly complicated and often require extra overhead in the form of parity bits and associated processing.

The present invention proposes a very simple, but effective, signal quality estimator that beneficially uses data that is already available from the matched filters 420(I), 420(Q), and as already processed by another system function, the Large Adjust Block 800. As shown in FIG. 9, the Large Adjust Block 800 communicates with a Signal Quality Block 900 which, in turn, outputs a Signal Quality signal that is calculated as follows.

The SNR is beneficially estimated according to the present invention by simply taking the peak matched filter output energy outside of a timing window that surrounds the desired signal (corresponding roughly to the Noise floor) and subtracting this value from the peak energy inside the timing window that contains the signal. The difference signal is integrated during an Rx Frame and made available to the system controller 37 for muting, when appropriate. This new approach to estimating signal quality can be described mathematically, as follows:

$$SNR = \Sigma(Peak\ MF\ Energy\ In\ Window) - (Peak\ MF\ Energy\ Outside\ of\ Window)$$

This SNR estimate is acceptable for use with short code sequences. For a short code sequence, and with appropriate Window sizes, the SNR estimate is a good monatomic indicator of the Baseband Modems's Bit Error Rate (BER) for all useable range from 10% BER to 0.01% BER. As to "appropriate" Window sizes, the SNR estimate of the present invention works best with Window sizes wherein the number of in-window samples are small as compared to out-of-window, or total, samples.

Figure 18:
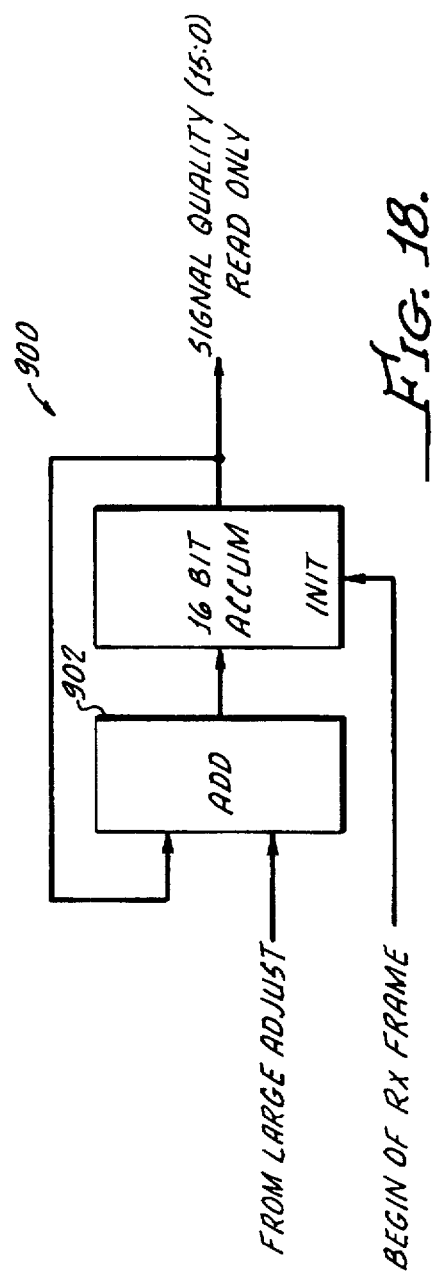
FIG. 18 is a block diagram of the Signal Quality Block 900 of FIG. 9.

FIG. 18 shows a block diagram for the preferred Signal Quality Block 900 wherein the peak in-window/out-of-window difference data for each bit interval, provided by the Large Adjust Block 600, is accumulated over an Rx Frame using a 16 bit accumulator 904 and an adder 902, to generate the desired SignalQuality signal.

ID Word—Frame Timing

As mentioned above, the ID word is used to establish initial frame timing. During receive, the Large Adjust and Small Adjust timing loops in the Energy/Timing Detect block 440 lock onto the energy output of the matched filters 420(I), 420(Q). When a sequence of demodulated data transitions matches the ID word, the system responds and adjusts the frame timing counters to a know state.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A direct sequence spread spectrum communication system for receiving an analog spread spectrum baseband signal that was formed by directly modulating a carrier with the chips of a code sequence at a chip rate, the system comprising:

analog-to-digital converting means for converting the analog spread spectrum baseband signal to corresponding digital spread spectrum baseband data at a sampling rate;

matched filter means for removing the code sequence by correlating the digital spread spectrum baseband data with the code sequence, said matched filter means outputting correlation values at a sampling rate of the analog-to-digital converting means;

large adjust means for coarsely positioning a demodulation window that contains a plurality of correlation values that are in the vicinity of an ideal peak correlation value, the demodulation window having a nominal period of one bit interval to generally remain centered on the peak correlation value output by the matched filter means;

small adjust means for making small positioning adjustments to the demodulation window by comparing the correlation values that are on one side of a center value to the correlation values that are on the other side of the center value;

peak value determining means for determining a peak correlation value from among the plurality of correlation values in the demodulation window; and demodulation means for demodulating the peak correlation value.

2. The direct sequence spread spectrum communication system of claim 1 wherein there are five correlation values that are in the demodulation window, the five correlation values comprising EE, E, Center, L, and LL samples.

3. The direct sequence spread spectrum communication system of claim 2 wherein the sampling rate is two times the chip rate to provide two sample per chip analog-to-digital conversion and matched filtering that is suitable for relatively short code sequences.

4. The direct sequence spread spectrum communication system of claim 3 wherein the system is a digital cordless telephone.

5. The direct sequence spread spectrum communication system of claim 4 wherein the code sequence is an even code sequence having an equal number of "1's" and "0's".

6. The direct sequence spread spectrum communication system of claim 5 wherein the even code sequence is a bipolar code sequence wherein the "1's" and "0's" represent voltages of +1 and −1 volt, respectively.

7. The direct sequence spread spectrum communication system of claim 5 wherein the even code sequence is an even 12-Chip code sequence.

8. The direct sequence spread spectrum communication system of claim 4 wherein the code sequence is a 12-Chip augmented Barker Code.

9. The direct sequence spread spectrum communication system of claim 2 wherein the sampling rate is equal to the chip rate to provide one sample per chip analog-to-digital conversion and matched filtering that is suitable for relative long code sequences.

10. The direct sequence spread spectrum communication system of claim 1 wherein the analog spread spectrum baseband signal is demodulated into in-phase and quadrature components and further comprising analog-to-digital converting means and matched filter means for each of the in-phase and quadrature components.

11. In a digital cordless telephone having a basestation connectable to a switched telephone network and a handset, said basestation and handset communicating over an RF link using direct sequence spread spectrum modulation, said basestation and said handset each connected to receive and demodulate digital in-phase and quadrature baseband signals using analog-to-digital converters, matched filters, a demodulation circuit, and a window time tracking circuit, the window time tracking circuit comprising:

energy detector means for receiving in-phase and quadrature correlation data from the matched filters at a sampling rate and outputting an energy signal at the sampling rate;

window NCO means for periodically generating window timing signals on bit intervals to define an extended demodulation window spanning five sample intervals, a first two of the five sample intervals being designated EE and E and a last two of the five sample intervals being designated L and LL, said window NCO means adjusting the position of the demodulation window relative to a bit interval, if necessary, upon receiving a large adjust signal;

large adjust timing circuit means for receiving the energy signal from the energy detector means and, based on the window timing signals from the window NCO means, comparing a peak inside energy defined as the peak energy inside of the demodulation window to a peak outside energy defined as the peak energy outside of the demodulation window, said large adjust timing circuit means outputting the large adjust signal if the peak outside energy is larger than the peak inside energy; and small adjust timing circuit means for receiving the energy signal from the energy detector means and, based on the window timing signals from the window NCO means, determining if the demodulation window is moving relative to an energy centroid by comparing the EE and E correlation values to the L and LL correlation values, and if the demodulation window is moving, outputting a small adjust signal to advance or retard a main receiver clock.

12. The digital cordless telephone of claim 11 wherein the energy signal output by the energy detector means is a low-compute estimate of the energy contained in the in-phase I and quadrature Q correlation data.

13. The digital cordless telephone of claim 12 wherein the low-compute estimate of the energy contain in the in-phase I and quadrature Q correlation data is characterized by the formula:

$$Energy\ Estimate = Max(|I|, |Q|) + \frac{1}{4} * Min(|I|, |Q|).$$

14. The digital cordless telephone of claim 11 wherein the in-phase I and quadrature Q correlation data are coded into 8-bit, 2's complement values and the energy detector means comprises:

means for obtaining the absolute value of the I and Q values by exclusively-OR'ing the sign bit (7) with the value bits (6:0);

means for comparing the absolute value of the I and Q values to determine which is larger and which is smaller; and means for adding the larger value (bits 6:0) to ¼$^{th}$ of the smaller value (bits 6:2) to obtain the Energy Estimate.

15. The digital cordless telephone of claim 11 further comprising a reference oscillator for generating reference pulses and a clock generation circuit having an adjustable divider stage for generating the main receiver clock, the small adjust signal advancing or retarding the main receiver clock by temporarily causing the adjustable divider stage to require one less or one more reference pulse.

16. In a digital cordless telephone having a basestation connectable to a switched telephone network and a handset, said basestation and handset communicating over an RF link using direct sequence spread spectrum modulation, said basestation and said handset each connected to receive and demodulate digital in-phase and quadrature baseband signals using analog-to-digital converters and matched filters operating at a sample rate to produce complex in-phase and quadrature digital data, and a demodulation circuit, an improvement comprising:

extended time tracking means for defining and maintaining a multiple sample demodulation window around a centroid of correlation energy for each bit interval; and means for demodulating the in-phase and quadrature digital data that has the highest energy content within at least a portion of the demodulation window, the portion including a sample at a predicted center of the multiple sample demodulation window and at least two adjacent samples; and means for selecting one of the demodulated samples as best representing valid data.

17. The digital cordless telephone of claim 16 wherein the multiple sample demodulation window is a five-sample wide demodulation window.

18. The digital cordless telephone of claim 17 wherein the demodulating means demodulates the in-phase and quadrature digital data within a 3-sample wide portion of the demodulation window.

* * * * *